United States Patent
Pawlik et al.

(10) Patent No.: US 9,559,367 B2
(45) Date of Patent: Jan. 31, 2017

(54) LONG-LIFE MEMBRANE ELECTRODE ASSEMBLIES AND ITS USE IN FUEL CELLS

(75) Inventors: Jürgen Pawlik, Frankfurt (DE); Jochen Baurmeister, Eppstein (DE); Christoph Padberg, Wiesbaden (DE)

(73) Assignee: BASF Fuel Cell GmbH, Ludwigshafen (DE)

(*) Notice: Subject to any disclaimer, the term of this patent is extended or adjusted under 35 U.S.C. 154(b) by 1190 days.

(21) Appl. No.: 10/523,463

(22) PCT Filed: Jul. 31, 2003

(86) PCT No.: PCT/EP03/08460
§ 371 (c)(1),
(2), (4) Date: Jun. 13, 2005

(87) PCT Pub. No.: WO2004/015797
PCT Pub. Date: Feb. 19, 2004

(65) Prior Publication Data
US 2006/0014065 A1 Jan. 19, 2006

(30) Foreign Application Priority Data

Aug. 2, 2002 (DE) .................. 102 35 360

(51) Int. Cl.
H01M 8/10 (2016.01)
H01M 8/02 (2016.01)

(52) U.S. Cl.
CPC ......... H01M 8/0293 (2013.01); H01M 8/0273 (2013.01); H01M 8/0284 (2013.01);
(Continued)

(58) Field of Classification Search
CPC . H01M 8/0273; H01M 8/0276; H01M 8/0284
See application file for complete search history.

(56) References Cited

U.S. PATENT DOCUMENTS 4,012,303 A * 3/1977 D'Agostino et al. ........... 521/27
4,017,664 A 4/1977 Breault
(Continued)

FOREIGN PATENT DOCUMENTS

| CA | 2457608 | 2/2004 |
|---|---|---|
| CA | 2459775 | 3/2004 |

(Continued)

OTHER PUBLICATIONS

Machine translation of JP2001-196082, Okamoto et al., Jul. 19, 2001.*

(Continued)

Primary Examiner — Barbara Gilliam
Assistant Examiner — Helen M McDermott
(74) Attorney, Agent, or Firm — Drinker Biddle & Reath LLP

(57) ABSTRACT

The present invention relates to membrane electrode assemblies comprising two electrochemically active electrodes separated by a polymer electrolyte membrane, there being a polyimide layer on each of the two surfaces of the polymer electrolyte membrane that are in contact with the electrodes. The present membrane electrode assemblies may be used in particular for producing fuel cells which have a particularly high long-term stability.

38 Claims, 1 Drawing Sheet

(52) U.S. Cl.
CPC ......... *H01M 8/103* (2013.01); *H01M 8/1048* (2013.01); *H01M 8/1053* (2013.01); *H01M 8/1067* (2013.01); *H01M 8/1072* (2013.01); *Y02E 60/521* (2013.01); *Y02P 70/56* (2015.11)

(56) References Cited

U.S. PATENT DOCUMENTS

| | | | |
|---|---|---|---|
| 4,191,618 | A | 3/1980 | Coker et al. |
| 4,212,714 | A | 7/1980 | Coker et al. |
| 4,333,805 | A | 6/1982 | Davidson et al. |
| 4,695,518 | A | 9/1987 | Trocciola et al. |
| 5,464,700 | A * | 11/1995 | Steck et al. ............ 429/30 |
| 5,525,436 | A * | 6/1996 | Savinell et al. ............ 429/30 |
| 6,300,000 | B1 * | 10/2001 | Cavalca et al. ............ 429/40 |
| 6,399,234 | B2 * | 6/2002 | Bonk et al. ............ 429/32 |
| 2004/0058216 | A1 * | 3/2004 | Pineri ............ 429/33 |
| 2004/0096730 | A1 * | 5/2004 | Kuroki et al. ............ 429/44 |
| 2004/0096734 | A1 | 5/2004 | Calundann et al. |
| 2004/0118773 | A1 | 6/2004 | Uensal et al. |
| 2004/0127588 | A1 | 7/2004 | Calumdann et al. |
| 2004/0131909 | A1 | 7/2004 | Soczka-Guth et al. |

FOREIGN PATENT DOCUMENTS

| | | | | |
|---|---|---|---|---|
| DE | 100 52 242 | | 5/2002 | |
| DE | 101 10 752 | | 9/2002 | |
| DE | 101 17 686 | | 10/2002 | |
| DE | 101 17 687 | | 10/2002 | |
| DE | 101 40 147 | | 3/2003 | |
| DE | 101 44 815 | | 3/2003 | |
| JP | 61 216253 | | 9/1986 | |
| JP | 63 170860 | | 7/1988 | |
| JP | 02 148570 | | 6/1990 | |
| JP | 2001-185175 A | | 7/2001 | |
| JP | 2001 196082 | | 7/2001 | |
| WO | WO-96/13872 | | 5/1996 | |
| WO | WO-00/44816 | | 8/2000 | |
| WO | WO 02/43172 | * | 5/2002 | .............. H01M 8/02 |
| WO | WO 02/46278 | * | 6/2002 | ................ C08J 5/22 |

OTHER PUBLICATIONS

Yurdakul, Ahmet Ozgur, "Acid Doped Polybenzimidazole Membranes for High Temperature Proton Exchange Membrane Fuel Cells", A Thesis Submitted to the Graduate School of Natural and Applied Sciences of Middle East Technical University, Jul. 2007.

* cited by examiner

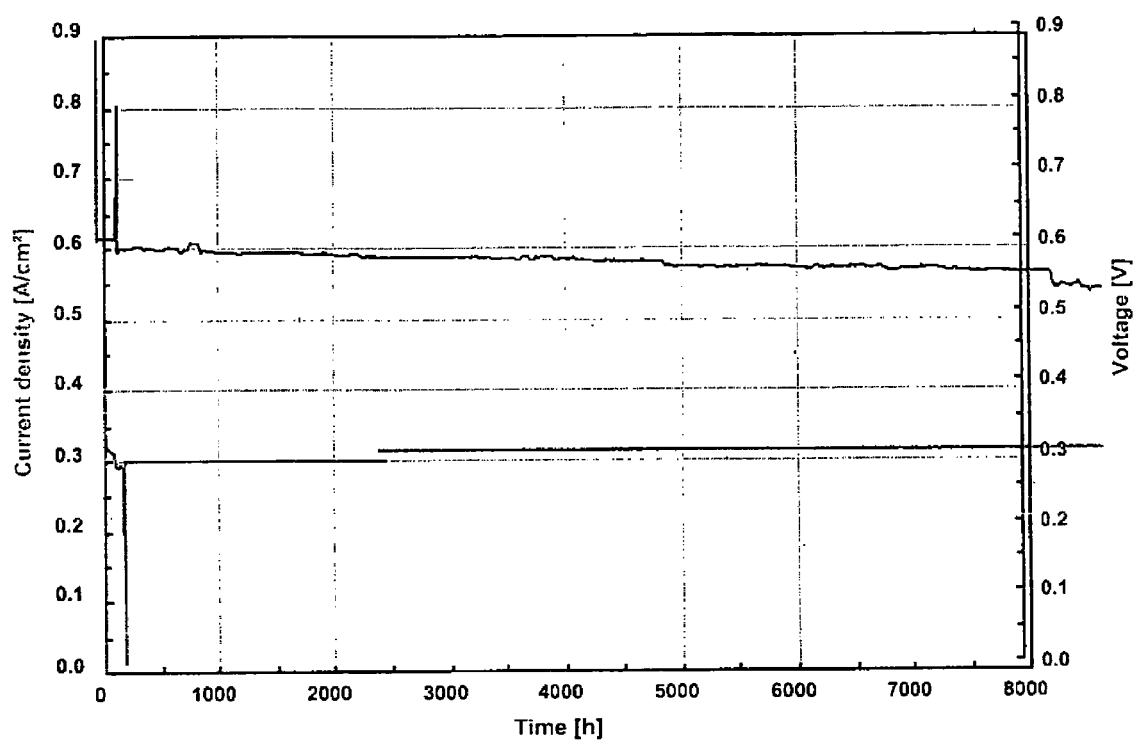

LONG-LIFE MEMBRANE ELECTRODE ASSEMBLIES AND ITS USE IN FUEL CELLS

This application is a national stage application (under 35 U.S.C. 371) of PCT/EP2003/008460 filed on Jul. 31, 2003 which claims benefit to German application serial no DE 102 35 360.3 filed Aug. 2, 2002.

The present invention relates to long-life membrane electrode assemblies comprising two electrochemically active electrodes separated by a polymer electrolyte membrane.

In polymer electrolyte membrane (PEM) fuel cells the proton-conducting membranes used are nowadays almost without exception polymers modified with sulfonic acids. The polymers employed are predominantly perfluorinated polymers. One prominent example is Nafion™ from DuPont de Nemours, Willmington USA. Proton conduction requires a relatively high water content in the membrane, typically of 4-20 molecules of water per sulfonic acid group. The necessary water content, but also the stability of the polymer in conjunction with acidic water and the reaction gases—hydrogen and oxygen—limits the operating temperature of the PEM fuel cell stack to 80-100° C. Higher operating temperatures are impossible to realize without a loss of fuel cell performance. At temperatures which for a given pressure level lie above the dew point of water the membrane dries out completely and the fuel cell no longer supplies electrical energy, since the resistance of the membrane climbs to levels so high that there is no longer any significant current flow.

A membrane electrode assembly with integrated seal which is based on the technology outlined above is described for example in U.S. Pat. No. 5,464,700. In the outer region of that membrane electrode assembly, on the areas of the membrane not covered by the electrodes, there are films of elastomers which at the same time represent the seal to the bipolar plates and to the exterior.

That measure enables a saving to be achieved in terms of very costly membrane material. Further advantages obtained by virtue of this construction relates to the contamination of the membrane. An improvement in long-term stability is not provided in U.S. Pat. No. 5,464,700. This is also apparent from the very low operating temperatures. In the description of the invention depicted in U.S. Pat. No. 5,464,700 there is a reference to the fact that the operating temperature of the cell is limited to 80° C. maximum. Elastomers are also generally suitable only for long-term service temperatures up to 100° C. Higher application temperatures cannot be achieved with elastomers. The technology described therein, then, is not suitable for fuel cells with operating temperatures above 100° C.

For technical reasons associated with the system, however, operating temperatures higher than 100° C. in the fuel cell are desirable. The activity of the precious-metal-based catalysts contained in the membrane electrode assembly (MEA) is substantially better at high operating temperatures.

Especially when what are called reformates, comprising hydrocarbons, are used, the reformer gas contains significant quantities of carbon monoxide, which must normally be removed by complex gas processing or gas purification. At high operating temperatures there is a rise in the tolerance of the catalysts for the CO impurities.

Furthermore, heat is produced during the operation of fuel cells. Cooling of these systems to below 80° C., however, can be very complicated. Depending on performance output, the cooling devices can be made significantly more simple in design.

In order to achieve these temperatures, membranes featuring new conductivity mechanisms are generally used. One approach to this is the use of membranes which exhibit electrical conductivity without the use of water. The first promising development in this direction is outlined in the publication WO 96/13872.

That publication also describes a first method of producing membrane electrode assemblies: two electrodes are pressed onto the membrane, each of them covering only part of the two principal faces of the membrane. A PTFE seal is pressed onto the remaining free part of the principal faces of the membrane in the cell, so that the gas spaces of anode and cathode are sealed from one another and from the environment. However, it has been found that a membrane electrode assemblies produced in this way has a high durability only with very small cell areas of 1 $cm^2$. If larger cells are produced, particularly cells having an area of at least 10 $cm^2$, the durability of the cells at temperatures of greater than 150° C. is limited to less than 100 hours.

Another high-temperature fuel cell is disclosed in the publication JP-A-2001-196082. Depicted therein is an electrode membrane assembly which is provided with a polyimide seal. A problem with this construction, however, is that sealing requires two membranes with a polyimide gasket between them. Since the chosen thickness of the membrane must be as small as possible for technical reasons, the thickness of the gasket between the two membranes described in JP-A-2001-196082 is extremely limited. In long-term tests it has been found that a construction of this kind is likewise not stable for a period of more than 1000 hours.

It is an object of the present invention, therefore, to provide improved membrane electrode assemblies and fuel cells which have a particularly long life.

The fuel cells ought in particular to be useful at operating temperatures above 100° C. and to manage without additional fuel gas moistening. In particular the membrane electrode assemblies ought to be able to withstand permanent or changing pressure differences between anode and cathode.

Furthermore, then, it was an object of the present invention to provide a membrane electrode assembly which can be produced simply and inexpensively.

The aforementioned objects are achieved by means of a membrane electrode assembly comprising two electrochemically active electrodes separated by a polymer electrolyte membrane, there being a polyimide layer provided on each of the two surfaces of the polymer electrolyte membrane that are in contact with the electrodes.

Polymer electrolyte membranes suitable for the purposes of the present invention are known per se. Membranes used for this purpose are generally membranes comprising acids, it being possible for the acids to be covalently bonded to polymers. A further possibility is for a sheetlike material to be doped with an acid, so as to form a suitable membrane.

Examples of sheetlike materials that can be used include polymer films, especially films comprising basic polymers, which may also be in the form of a blend with other polymers. Further sheetlike material which can be used includes chemically inert supports, preferably ceramic materials, particularly silicon carbides (SiC) as described in U.S. Pat. No. 4,017,664 and U.S. Pat. No. 4,695,518. In accordance with one particular aspect of the present invention these materials are capable of transporting protons by the Grotthus mechanism after doping with acid (K.-D. Kreuer, Chem. Mater. 1996, 8, 610-641).

Suitable basic polymer membranes doped with mineral acid include virtually all known polymer membranes in which the protons can be transported. Preference is given here to acids which are able to convey protons without additional water, by means for example of what is termed the Grotthus mechanism.

As the basic polymer for the purposes of the present invention it is preferred to use a basic polymer having at least one nitrogen atom in a repeating unit.

According to one preferred embodiment the repeating unit in the basic polymer comprises an aromatic ring having at least one nitrogen atom. The aromatic ring is preferably a five- or six-membered ring having one to three nitrogen atoms, which may be fused to another ring, in particular another aromatic ring.

A particularly preferred group of basic polymers is that of the polyazoles. A basic polymer based on polyazole contains repeating azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVI) and/or (XVII) and/or (XVIII) and/or (XIX) and/or (XX) and/or (XXI) and/or (XXII)

-continued

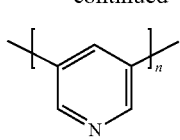
(XVI)

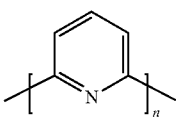
(XVII)

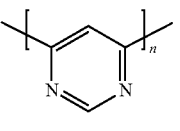
(XVIII)

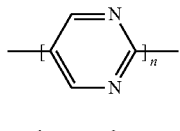
(XIX)

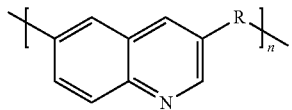
(XX)

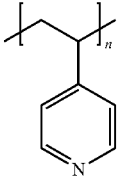
(XXI)

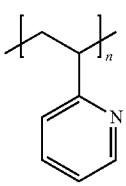
(XXII)

in which

Ar is identical or different at each occurrence and is a tetravalent aromatic or heteroaromatic group which may be monocyclic or polycyclic, $Ar^1$ is identical or different at each occurrence and is a divalent aromatic or heteroaromatic group which may be monocyclic or polycyclic, $Ar^2$ is identical or different at each occurrence and is a divalent or trivalent aromatic or heteroaromatic group which may be monocyclic or polycyclic, $Ar^3$ is identical or different at each occurrence and is a trivalent aromatic or heteroaromatic group which may be monocyclic or polycyclic, $Ar^4$ is identical or different at each occurrence and is a trivalent aromatic or heteroaromatic group which may be monocyclic or polycyclic, $Ar^5$ is identical or different at each occurrence and is a tetravalent aromatic or heteroaromatic group which may be monocyclic or polycyclic, $Ar^6$ is identical or different at each occurrence and is a divalent aromatic or heteroaromatic group which may be monocyclic or polycyclic, $Ar^7$ is identical or different at each occurrence and is a divalent aromatic or heteroaromatic group which may be monocyclic or polycyclic, $Ar^8$ is identical or different at each occurrence and is a trivalent aromatic or heteroaromatic group which may be monocyclic or polycyclic, $Ar^9$ is identical or different at each occurrence and is a divalent or trivalent or tetravalent aromatic or heteroaromatic group which may be monocyclic or polycyclic, $Ar^{10}$ is identical or different at each occurrence and is a divalent or trivalent aromatic or heteroaromatic group which may be monocyclic or polycyclic, $Ar^{11}$ is identical or different at each occurrence and is a divalent aromatic or heteroaromatic group which may be monocyclic or polycyclic, X is identical or different at each occurrence and is oxygen, sulfur or an amino group which carries a hydrogen atom, a group containing 1-20 carbon atoms, preferably a branched or nonbranched alkyl or alkoxy group, or an aryl group as a further radical, R is identical or different at each occurrence and is hydrogen, an alkyl group and an aromatic group, with the proviso that R in formula XX is a divalent group, and n and m are each an integer greater than or equal to 10, preferably greater than or equal to 100.

Preferred aromatic or heteroaromatic groups derived from benzene, naphthalene, biphenyl, diphenyl ether, diphenylmethane, diphenyldimethylmethane, bisphenone, diphenyl sulfone, quinoline, pyridine, bipyridine, pyridazine, pyrimidine, pyrazine, triazine, tetrazine, pyrole, pyrazole, anthracene, benzopyrrole, benzotriazole, benzooxathiadiazole, benzooxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which if desired may also be substituted.

The substitution pattern of $Ar^1$, $Ar^4$, $Ar^6$, $Ar^7$, $Ar^8$, $Ar^9$, $Ar^{10}$ and $Ar^{11}$ is arbitrary; in the case of phenylene, for example, $Ar^1$, $Ar^4$, $Ar^6$, $Ar^7$, $Ar^8$, $Ar^9$, $Ar^{10}$ or $Ar^{11}$ can be ortho-, meta- and para-phenylene. Particularly preferred groups derive from benzene and biphenylene, which if desired may also be substituted.

Preferred alkyl groups are short-chain alkyl groups having 1 to 4 carbon atoms, such as methyl, ethyl, n- or isopropyl and t-butyl groups.

Preferred aromatic groups are phenyl or naphthyl groups. The alkyl groups and the aromatic groups can be substituted.

Preferred substituents are halogen atoms such as fluorine, amino groups, hydroxyl groups or short-chain alkyl groups such as methyl or ethyl groups.

Preference is given to polyazoles containing repeating units of the formula (I) in which the radicals X are the same within a repeating unit.

The polyazoles may in principle also contain different repeating units, differing for example in their radical X. Preferably, however, there are only the same radicals X in one repeating unit.

Further preferred polyazole polymers are polyimidazoles, polybenzothiazoles, polybenzoxazoles, polyoxadiazoles, polyquinoxalines, polythiadiazoles, poly(pyridines), poly(pyrimidines), and poly(tetrazapyrenes).

In another embodiment of the present invention the polymer comprising repeating azole units is a copolymer or a blend containing at least two units of the formula (I) to (XXII) which are different from one another. The polymers may be in the form of block copolymers (diblock, triblock), random copolymers, periodic copolymers and/or alternating polymers.

In a particularly preferred embodiment of the present invention the polymer comprising repeating azole units is a polyazole containing only units of the formula (I) and/or (II).

The number of repeating azole units in the polymer is preferably a whole number greater than or equal to 10.

Particularly preferred polymers contain at least 100 repeating azole units.

In the context of the present invention preference is given to polymers comprising repeating benzimidazole units. Some examples of the very advantageous polymers comprising repeating benzimidazole units are shown by the formulae below:

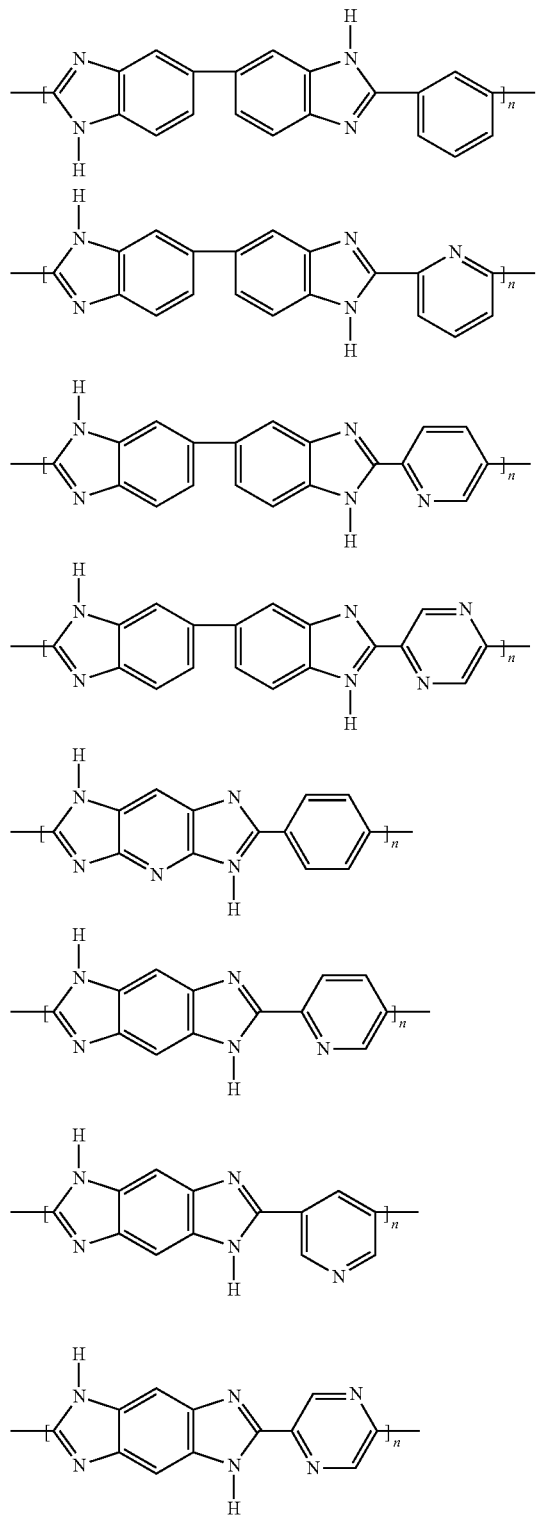
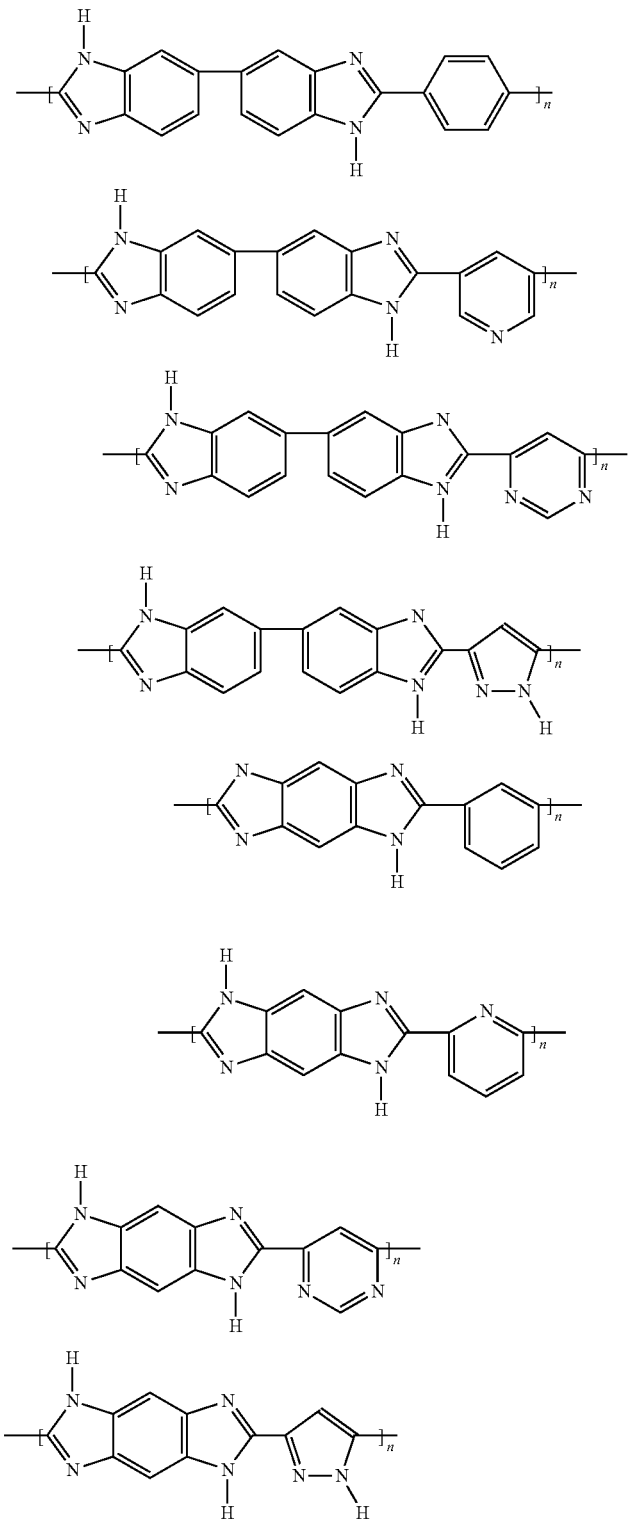

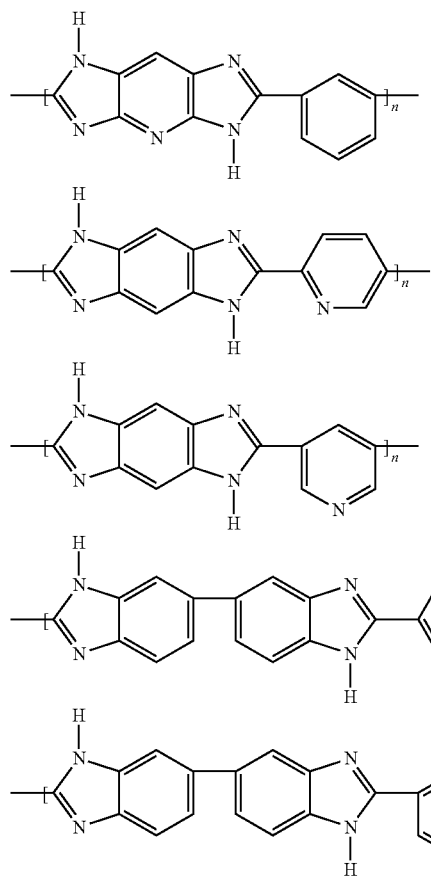
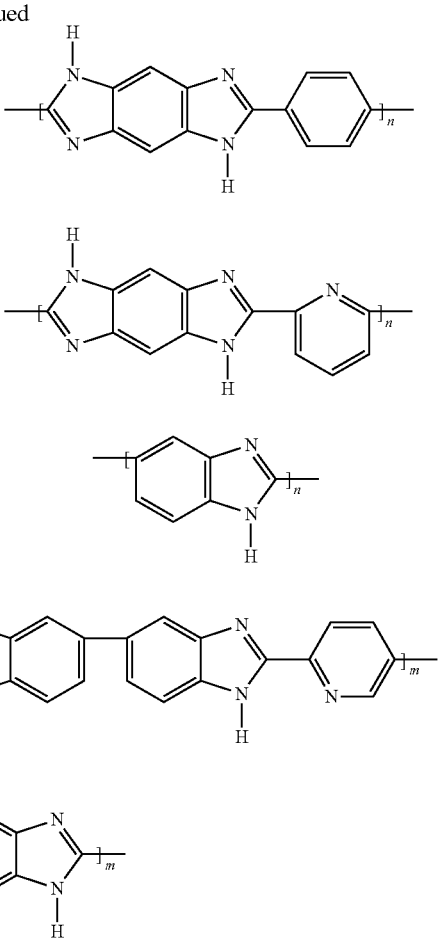

where n and m are each an integer greater than or equal to 10, preferably greater than or equal to 100.

The polyazoles used, but in particular the polybenzimidazoles, feature a high molecular weight. Measured as the intrinsic viscosity this is at least 0.2 dl/g, preferably from 0.8 to 10 dl/g, in particular from 1 to 10 dl/g.

The preparation of such polyazoles is known: one or more aromatic tetraamino compounds are reacted with one or more aromatic carboxylic acids and/or esters thereof containing at least two acid groups per carboxylic acid monomer in the melt to form a prepolymer. The prepolymer formed solidifies in the reactor and is subsequently mechanically comminuted. The pulverulent prepolymer is customarily subjected to final polymerization in a solid-phase polymerization at temperatures of up to 400° C.

The preferred aromatic carboxylic acids include, among others, dicarboxylic acids and tricarboxylic acids and tetracarboxylic acids and/or their esters or their anhydrides or their acid chlorides. The term "aromatic carboxylic acids" embraces equally heteroaromatic carboxylic acids as well.

The aromatic dicarboxylic acids are preferably isophthalic acid, terephthalic acid, phthalic acid, 5-hydroxy-isophthalic acid, 4-hydroxyisophthalic acid, 2-hydroxy-terephthalic acid, 5-aminoisophthalic acid, 5-N,N-dimethyl-aminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoro-isophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether 4,4'-dicarboxylic acid, benzophenone-4,4'-dicarboxylic acid, diphenyl sulfone 4,4'-dicarboxylic acid, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid, and the C1-C20 alkyl esters or C5-C12 aryl esters thereof, or the acid anhydrides thereof or the acid chlorides thereof.

The aromatic tri- and tetracarboxylic acids and their C1-C20 alkyl esters or C5-C12 aryl esters or their acid anhydrides or their acid chlorides are preferably 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid, 3,5,4'-biphenyltricarboxylic acid.

The aromatic tetracarboxylic acids and/or their C1-C20 alkyl esters or C5-C12 aryl esters or their acid anhydrides or their acid chlorides are preferably 3,5,3',5'-bi-phenyltetracarboxylic acid, 1,2,4,5-benzenetetracarboxylic acid, benzophenone-tetracarboxylic acid, 3,3',4,4'-diphenyltetracarboxylic acid, 2,2',3,3'-biphenyltetra-carboxylic acid, 1,2,5,6-naphthalenetetracarboxylic acid, 1,4,5,8-naphthalenetetracarboxylic acid.

The heteroaromatic carboxylic acids used are preferably heteroaromatic dicarboxylic acids and tricarboxylic acids and tetracarboxylic acids and their esters or their anhydrides. By heteroaromatic carboxylic acids are meant aromatic systems which contain at least one nitrogen, oxygen, sulfur or phosphorus atom in the aromatic moiety. The compounds in question are preferably pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridine-tricarboxylic acid, benzimidazole-5,6-dicarboxylic acid, and also their C1-C20 alkyl esters or C5-C12 aryl esters, or their acid anhydrides or their acid chlorides.

The amount of tricarboxylic acid and/or tetracarboxylic acids (based on dicarboxylic acid used) is between 0 and 30 mol %, preferably 0.1 and 20 mol %, in particular 0.5 and 10 mol %.

The aromatic and heteroaromatic diaminocarboxylic acids used are preferably diaminobenzoic acid and the mono- and dihydrochloride derivatives thereof.

Preference will be given to using mixtures of at least 2 different aromatic carboxylic acids. With particular preference mixtures are used which in addition to aromatic carboxylic acids contain heteroaromatic carboxylic acids as well. The mixture ratio of aromatic carboxylic acids to heteroaromatic carboxylic acids is between 1:99 and 99:1, preferably from 1:50 to 50:1.

These mixtures are, in particular, mixtures of N-heteroaromatic dicarboxylic acids and aromatic dicarboxylic acids. Nonlimiting examples thereof are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether 4,4'-dicarboxylic acid, benzophenone-4,4'-dicarboxylic acid, diphenyl sulfone 4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid and 2,5-pyrazinedicarboxylic acid.

The preferred aromatic tetraamino compounds include, among others, 3,3',4,4'-tetra-aminobiphenyl, 2,3,5,6-tetraaminopyridine, 1,2,4,5-tetraaminobenzene, 3,3',4,4'-tetraaminodiphenyl sulfone, 3,3',4,4'-tetraaminodiphenyl ether, 3,3',4,4'-tetra-aminobenzophenone, 3,3',4,4'-tetraaminodiphenylmethane and 3,3',4,4'-tetraaminodiphenyldimethylmethane and also the salts thereof, in particular their mono-, di-, tri- and tetrahydrochloride derivatives.

Preferred polybenzimidazoles are available commercially under the trade name ®Celazole from Celanese AG.

Besides the aforementioned polymers it is also possible to use a blend that contains further polymers. The purpose of the blend component is essentially to improve the mechanical properties and to reduce the costs of the material. One preferred blend component in this context is polyether sulfone as described in German patent application No. 10052242.4.

For producing polymer films the polyazole is dissolved in a further step in polar aprotic solvents such as dimethylacetamide (DMAc), for example, and a film is produced by conventional methods.

Solvent residues can be removed by treating the resulting film with a wash liquid. This wash liquid is preferably selected from the group consisting of alcohols, ketones, alkanes (aliphatic and cycloaliphatic), ethers (aliphatic and cycloaliphatic), esters, carboxylic acids, in which case the above group members may be halogenated, water, inorganic acids (such as $H_3PO_4$ and $H_2SO_4$, for example) and mixtures thereof are used.

Use is made in particular of $C_1$-$C_{10}$ alcohols, $C_2$-$C_5$ ketones, $C_1$-$C_{10}$ alkanes (aliphatic and cycloaliphatic), $C_2$-$C_6$ ethers (aliphatic and cycloaliphatic), $C_2$-$C_5$ esters, $C_1$-$C_3$ carboxylic acids, dichloromethane, water, inorganic acids (such as $H_3PO_4$ and $H_2SO_4$, for example) and mixtures thereof. Of these liquids particular preference is given to water.

After washing, the film can be dried in order to remove the wash liquid. Drying takes place as a function of the partial vapor pressure of the treatment liquid chosen. Normally drying takes place under atmospheric temperature at temperatures between 20° C. and 200° C. More gentle drying may also take place in vacuo. Instead of drying the membrane can also be dabbed dry and so freed from excess treatment liquid. The sequence is not critical.

The above-described cleaning of the polyazole film to remove solvent residues results surprisingly in an improvement in the mechanical properties of the film. These properties include in particular the elasticity modulus, the tensile strength and the fracture toughness of the film.

The polymer film may additionally feature further modifications, by crosslinking as in German patent application No. 10110752.8 or in WO 00/44816, for example. In one preferred embodiment the polymer film used, comprising a basic polymer and at least one blend component, further comprises a crosslinker as described in German patent application No 10140147.7.

Instead of the polymer films produced by conventional methods it is also possible to use the polyazole-containing polymer membranes as described in German patent applications Nos. 10117686.4, 10144815.5, 10117687.2.

The thickness of the polyazole films may lie within wide ranges. Preferably the thickness of the polyazole film prior to doping with acid lies in the range from 5 μm to 2000 μm, more preferably from 10 μm to 1000 μm, without any intention that this should constitute a restriction.

In order to obtain proton conductivity these films are doped with an acid. Acids in this context include all known Lewis and Brønsted acids, preferably inorganic Lewis and Brønsted acids.

Also possible, furthermore, is the use of polyacids, especially isopolyacids and heteropolyacids, and mixtures of different acids. For the purposes of the present invention heteropolyacids are inorganic polyacids having at least two different central atoms, which are formed as partial mixed anhydrides from in each case weak polybasic oxo acids of a metal (preferably Cr, Mo, V, W) and of a nonmetal (preferably As, I, P, Se, Si, Te). They include, among others, 12-molybdato phosphoric acid and 12-tungstophosphoric acid.

The degree of doping can be used to influence the conductivity of the polyazole film. The conductivity increases with increasing concentration of dopant until a maximum value is reached. In accordance with the invention the degree of doping is indicated in moles of acid per mole repeating unit of the polymer. For the purposes of the present invention a degree of doping of between 3 and 30, in particular between 5 and 18, is preferred.

Particularly preferred dopants are sulfuric acid and phosphoric acid. An especially preferred dopant is phosphoric acid ($H_3PO_4$). Highly concentrated acids are generally used here. According to one particular aspect of the present invention the concentration of the phosphoric acid is at least 50% by weight %, in particular at least 80% by weight, based on the weight of the dopant.

Doped polyazole films can also be obtained by a method comprising the steps comprising the steps of
I) dissolving the polyazole polymer in polyphosphoric acid,
II) heating the solution obtainable in accordance with step A) under inert gas to temperatures of up to 400° C.,
III) forming a membrane using the solution of the polyazole polymer according to step II) on a support, and
IV) treating the membrane formed in step III) until it is self-supporting.

Doped polyazole films can also be obtained by a method comprising the steps of
A) mixing one or more aromatic tetraamino compounds with one or more aromatic carboxylic acids and/or esters thereof containing at least two acid groups per carboxylic acid monomer, or mixing one or more aromatic and/or heteroaromatic diaminocarboxylic acids in polyphosphoric acid to form a solution and/or dispersion,
B) applying a layer using the mixture according to step A) to a support or to an electrode,
C) heating the sheetlike structure/layer obtainable according to step B) under inert gas to temperatures of up to 350° C., preferably up to 280° C., to form the polyazole polymer,
D) treating the membrane formed in step C) (until it is self-supporting).

The aromatic and/or heteroaromatic carboxylic acid and tetraamino compounds for use in step A) have been described above.

The polyphosphoric acid used in step A) comprises commercially customary polyphosphoric acids such as are obtainable for example from Riedel-de Haen. The polyphosphoric acids $H_{n+2}P_nO_{3n+1}$ (n>1) normally possess a purity, calculated as $P_2O_5$ (by acidimetry), of at least 83%. Instead of a solution of the monomers it is also possible to produce a dispersion/suspension.

The mixture produced in step A) has a weight ratio of polyphosphoric acid to the sum of all the monomers of from 1:10000 to 10000:1, preferably from 1:1000 to 1000:1, in particular from 1:100 to 100:1.

Layer formation in accordance with step B) takes place by means of measures known per se (casting, spraying, knife-coating) which are known from the prior art relating to polymer film production. Suitable supports are all supports which can be referred to as inert under the conditions. In order to adjust the viscosity it is possible if desired to add phosphoric acid (concentrated phosphoric acid, 85%) to the solution. By this means the viscosity can be adjusted to the desired figure and the formation of the membrane can be made easier.

The layer produced according to step B) has a thickness of between 20 and 4000 μm, preferably between 30 and 3500 μm, in particular between 50 and 3000 μm.

Where the mixture according to step A) also includes tricarboxylic acids and/or tetracarboxylic acids, this produces branching/crosslinking in the polymer formed. This contributes to improving the mechanical property. Treatment of the polymer layer produced according to step C) in the presence of moisture at temperatures and for a duration sufficient for the layer to possess adequate strength for use in fuel cells. Treatment may be carried out to the point where the membrane is self-supporting, so that it can be detached without damage from the support.

According to step C) the sheetlike structure obtained in step B) is heated to a temperature of up to 350° C., preferably up to 280° C. and more preferably in the range from 200° C. to 250° C. The inert gases to be used in step C) are known in the art. They include, in particular, nitrogen, and also noble gases, such as neon, argon and helium.

In one version of the method the formation of oligomers and/or polymers may be brought about simply by heating the mixture from step A) to temperatures of up to 350° C., preferably up to 280° C. Depending on the chosen temperature and duration it is possible subsequently to do without some or all of the heating in step C). This version is also subject matter of the present invention.

The treatment of the membrane in step D) takes place at temperatures above 0° C. and less than 150° C., preferably at temperatures between 10° C. and 120° C., in particular between room temperature (20° C.) and 90° C., in the presence of moisture and/or water and/or water vapor and/or water-containing phosphoric acid of up to 85%. The treatment takes place preferably under atmospheric pressure, but may also take place under pressure exposure. What is important is that the treatment takes place in the presence of sufficient moisture, the polyphosphoric acid present undergoing partial hydrolysis to form low molecular mass polyphosphoric acid and/or phosphoric acid and thereby contributing to strengthening the membrane.

The partial hydrolysis of the polyphosphoric acid in step D) leads to a strengthening of the membrane and to a decrease in the layer thickness and the formation of a membrane having a thickness of between 15 and 3000 μm, preferably between 20 and 2000 μm, in particular between 20 and 1500 μm, which is self-supporting.

The intramolecular and intermolecular structures (interpenetrating networks; IPN) present in the polyphosphoric acid layer according to step B) lead in step C) to an ordered membrane formation, which proves responsible for the particular properties of the membrane formed.

The upper temperature limit of the treatment according to step D) is generally 150° C. In the case of extremely short moisture exposure—for example, exposure to superheated steam, this steam may also be hotter than 150° C. Key to the upper temperature limit is the duration of the treatment.

The partial hydrolysis (step D) may also take place in climatically controlled chambers in which the hydrolysis can be specifically controlled under defined moisture exposure. The humidity in this case may be set specifically by means of the temperature and/or saturation of the contacting environment, for example, gases such as air, nitrogen, carbon dioxide or other suitable gases, or steam. The duration of treatment is dependent on the parameters chosen above.

The treatment period is also dependent on the thickness of the membrane.

Generally speaking, the period of treatment is between a few seconds to minutes, on exposure to superheated steam for example, or up to whole days, in air at room temperature with low relative atmospheric humidity, for example. The period of treatment is preferably between 10 seconds and 300 hours, in particular from 1 minute to 200 hours.

If the partial hydrolysis is carried out at room temperature (20° C.) with ambient air having a relative atmospheric humidity of 40-80%, the treatment period is between 1 and 200 hours.

The membrane obtained in accordance with step D) can be designed so as to be self-supporting; that is, it can be detached from the support without damage and subsequently processed further directly if desired.

By way of the degree of hydrolysis, i.e., the duration, temperature and ambient humidity, it is possible to adjust the concentration of phosphoric acid and hence the conductivity of the polymer membrane. The concentration of the phosphoric acid is specified as moles of acid per mole of repeating unit of the polymer. By means of the method comprising steps A) to D) it is possible to obtain membranes having a particularly high phosphoric acid concentration. Preference is given to a concentration (moles of phosphoric acid per repeating unit of the formula (I), polybenzimidazole, for example) of between 10 and 50, in particular between 12 and 40. Degrees of doping of this level (concentrations) are very difficult if not impossible to obtain by doping polyazoles with commercially available ortho-phosphoric acid.

In accordance with a modification of the method described, in which doped polyazole films are produced by using polyphosphoric acid, these films can also be produced by a method comprising the steps of
1) reacting one or more aromatic tetraamino compounds with one or more aromatic carboxylic acids and/or esters thereof containing at least two acid groups per carboxylic acid monomer, or one or more aromatic and/or heteroaromatic diaminocarboxylic acids in the melt at temperatures of up to 350° C., preferably up to 300° C.,
2) dissolving the solid prepolymer obtained according to step 1) in polyphosphoric acid,
3) heating the solution obtainable according to step 2) under inert gas to temperatures of up to 300° C., preferably up to 280° C., to form the dissolved polyazole polymer,
4) forming a membrane using the solution of the polyazole polymer according to step 3) on a support, and
5) treating the membrane formed in step 4) until it is self-supporting.

The method steps set out under sections 1) to 5) have been elucidated in more detail above for steps A) to D), to which reference is made, particularly in respect of preferred embodiments.

A membrane, especially a membrane based on polyazoles, can also be surface-crosslinked by exposure to heat in the presence of atmospheric oxygen. This curing of the membrane surface additionally improves the properties of the membrane. For this purpose the membrane can be heated to a temperature of at least 150° C., preferably at least 200° C. and more preferably at least 250° C. The oxygen concentration for this method step is usually in the range from 5 to 50% by volume, preferably from 10 to 40% by volume, without any intention that this should constitute a restriction.

Crosslinking may also take place by exposure to IR or NIR (IR=infrared, i.e., light having a wavelength of more than 700 nm; NIR=near IR, i.e., light having a wavelength in the range from about 700 to 2000 nm or an energy in the range from about 0.6 to 1.75 eV). Another method is to irradiate with β radiation. The radiation dose in this case is between 5 and 200 kGy.

The duration of the crosslinking reaction may lie within a wide range depending on the desired degree of crosslinking. Generally speaking, this reaction time is in the range from 1 second to 10 hours, preferably from 1 minute to 1 hour, without any intention that this should constitute a restriction.

The membrane electrode assembly of the invention comprises on both surfaces of the polymer electrolyte membrane that are in contact with the electrodes a polyimide layer which at least partly covers the surfaces of the membrane that are not in contact with the electrodes. Generally speaking, the polyimide layers cover at least 80% of the electrode-free area of the membrane.

According to one preferred embodiment of the present invention the surfaces of the polymer electrolyte membrane are completely covered by the two electrodes and the polyimide layers.

Polyimides are known in the art. These polymers contain imide groups as key structural units of the main chain and are described for example in Ullmann's Encyclopedia of Industrial Chemistry 5$^{th}$ Ed. on CD-ROM, 1998, Keyword Polyimides.

The polyimides also include polymers which in addition to imide groups also contain amide groups (polyamide imides), ester groups (polyester imides) and ether groups (polyether imides) as components of the main chain.

Polyimides which can be used for the purposes of the present invention preferably exhibit a long-term service temperature of at least 190° C., preferably at least 220° C. and more preferably at least 250° C. as measured in accordance with MIL-P-46112B, paragraph 4.4.5.

Preferred polyimides contain repeating units of the formula (VI)

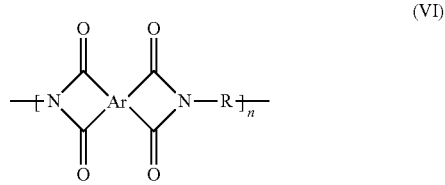

in which the radical Ar is as defined above and the radical R is an alkyl group or a divalent aromatic or heteroaromatic group having 1 to 40 carbon atoms. Preferably the radical R is a divalent aromatic or heteroaromatic group deriving from benzene, naphthalene, biphenyl, diphenyl ether, diphenyl ketone, diphenyl methane, diphenyldimethylmethane, bisphenone, diphenyl sulfone, quinoline, pyridine, bipyridine, anthracene, thiadiazole and phenanthrene, which if desired may also be substituted. The index n indicates that the repeating units constitute part of the polymers.

Polyimides of this kind are available commercially under the trade names ®Kapton, ®Vespel, ®Toray and ®Pyralin from DuPont and also ®Ultem from GE Plastics and ®Upilex from Ube Industries.

The thickness of the polyimide layer is preferably in the range from 5 μm to 1000 μm, in particular from 10 μm to 500 μm and more preferably from 25 μm to 100 μm.

The polyimide layers present on the polymer electrolyte membrane may in each case form a frame.

According to one particular aspect of the present invention the polyimide layers may be provided with fluoropolymers. By this means it is possible surprisingly to improve the long-term stability of the MEAs.

Suitable fluoropolymers are known in the art. They include, among others, polyfluorotetraethylene (PTFE) and poly(tetrafluoroethylene-co-hexafluoropropylene) (FEP). The layer of fluoropolymer on the polyimide layer generally has a thickness of at least 0.5 μm, in particular at least 2.5 μm. This layer can be provided between the polymer electrolyte membrane and the polyimide layer. It is also possible for the layer to be applied on the side facing away from the polymer electrolyte membrane. An additional possibility is for both surfaces of the polyimide layer to be provided with a layer of fluoropolymer.

Polyimide films provided with fluoropolymers that can be used in accordance with the invention are available commercially under the trade name ®Kapton FN from DuPont.

The two polyimide layers may extend beyond the polymer electrolyte membrane and may be in flat contact with one another. The areas of the polyimide layers that are in contact with one another can be welded in this case. Connection of this kind can be made easier in particular by means of at least one layer of fluoropolymer.

The two polyimide layers are normally in contact with electrically conducting separator plates, which are typically provided with flowfield channels on the sides facing the electrodes, in order to allow the distribution of reactant fluids. The separator plates are normally manufactured from graphite or from conductive, heat-resistant plastic.

A membrane electrode assembly of the invention has two electrochemically active electrodes. The term "electrochemically active" indicates that the electrodes are capable of catalyzing the oxidation of $H_2$ and the reduction of $O_2$. This property may be obtained by coating the electrodes with platinum and/or ruthenium. The term "electrode" means that the material has an electron conductivity, it being possible for the electrode optionally to have a layer of precious metal, without being restricted to this. Electrodes of this kind are known and are described for example in U.S. Pat. No. 4,191,618, U.S. Pat. No. 4,212,714 and U.S. Pat. No. 4,333,805. It is usual to use flat, electrically conducting and acid-resistant structures for this purpose. Such structures include, for example, graphite fiber papers, carbon fiber papers, graphite woven structures and/or papers made conductive by addition of carbon black.

The electrochemically active area of the electrodes designates the area which is in contact with the polymer electrolyte membrane and at which the redox reactions described above can take place. The present invention allows particularly large electrochemically active areas to be formed. According to one particular aspect of the present invention the size of said electrochemically active area is at least 2 $cm^2$, in particular at least 5 $cm^2$ and preferably at least 10 $cm^2$, without any intention that this should constitute a restriction.

According to one particular embodiment at least one of the electrodes may be composed of a compressible material. For the purposes of the present invention a compressible material is characterized by the property whereby the electrode can be compressed to half, in particular one third, of its original thickness without losing its integrity.

This property is generally possessed by electrodes made of graphite woven and/or paper which has been made conductive by addition of carbon black.

Surprisingly it is possible for the long-term stability of the membrane electrode assembly to be improved by virtue of there being at least one of the polyimide layers in contact with at least one of the electrodes. According to one preferred embodiment both polyimide layers are in contact with one electrode each. In this case the polyimide layer can be arranged between the membrane and the electrode. It is also possible for the polyimide layer to be in contact with the surface which is facing away from the membrane.

Generally speaking, the contact area between polyimide layer and electrode is at least 0.2 $mm^2$, in particular at least 5 $mm^2$, without any intention that this should constitute a restriction. The upper limit of the contact area between electrode and polyimide layer is imposed by economic considerations. The contact area is preferably less than or equal to 100%, in particular less than or equal to 80% and more preferably less than or equal to 60%, based on the electrochemically active area.

The polyimide layer can be in contact with the electrode via the side faces. The side faces are the areas formed by the thickness of the electrode and of the polyimide layer, respectively, and by the respective length and width of these layers.

The polyimide layer is preferably in contact with the electrode by way of the surface, which is defined by way of the length and the width of the polyimide layer and of the electrode, respectively.

This contact area of the electrode can be provided with fluoropolymer in order to improve the adhesion between polyimide layer and electrode.

The production of membrane electrode assemblies of the invention is obvious to the skilled worker. Generally speaking, the various components of the membrane electrode assembly are placed on top of one another and joined to one another by pressure and temperature. Lamination takes place generally at a temperature in the range from 10 to 300° C., in particular from 20° C. to 200°, and with a pressure in the range from 1 to 1000 bar, in particular from 3 to 300 bar.

One preferred embodiment can be produced, for example, by first manufacturing a frame from a polyimide film. This frame is subsequently placed on a made-up electrode coated with a catalyst, platinum for example, the frame overlapping with the electrode. The amount of overlap is generally from 0.2 to 5 mm. A metal plate having the same shape and size as the polymer film is then placed onto the polymer film frame; in other words, it does not cover the free electrode area. By this means it is possible to compress the polymer mask and the underlying part of the electrode to form an intimate assembly without damaging the electrochemically active area of the electrode. By means of the metal plate the polyimide frame is laminated with the electrode under the conditions specified above.

To produce a membrane electrode assembly of the invention a polymer electrolyte membrane is placed between two of the above-obtained polyimide frame electrode units. Subsequently an assembly is produced by means of pressure and temperature.

After cooling, the finished membrane electrode assembly (MEA) is ready for operation and can be used in a fuel cell.

A particularly surprising finding was that, owing to their dimensional stability under fluctuating ambient temperatures and atmospheric humidity, membrane electrode assemblies of the invention can be stored or dispatched without problems. Even after prolonged storage or after dispatch to sites having very different climatic conditions, the dimensions of the MEA are in agreement, with no problems for incorporation into fuel cell stacks. In that case, for external incorporation, there is no longer any need to condition the MEA on site, thereby simplifying the production of the fuel cell and saving on time and costs.

One advantage of the MEAs of the invention is that they allow the fuel cell to be operated at temperatures above 120° C. This applies to gaseous and liquid fuels, such as hydrogen-containing gases, which are produced, for example, from hydrocarbons in an upstream reforming step. The oxidant used in that case may be oxygen or water, for example.

A further advantage of the MEAs of the invention is that, on operation above 120° C., they exhibit a high tolerance toward carbon monoxide even with pure platinum catalysts, i.e., without a further alloying component. At temperatures of 160° C., for example, it is possible for there to be at least 1% CO in the fuel gas without this leading to a noticeable reduction in the performance of the fuel cell.

The MEAs of the invention can be operated in fuel cells without any need to moisten the fuel gases and the oxidants, despite the possibly high operating temperatures. The fuel cell nevertheless operates stably and the membrane does not lose its conductivity. This simplifies the entire fuel cell system and brings additional cost savings, since the management of the water circulation is simplified. Moreover, this also improves the behavior of the fuel cell system at temperatures below 0° C.

The MEAs of the invention surprisingly allow the fuel cells to be cooled without problems to room temperature or below and then to be started up again without losing performance. Conventional fuel cells based on phosphoric acid, in contrast, always have to be held at a temperature above 80° C. when the fuel cell is switched off, in order to avoid irreversible damage.

Furthermore, the MEAs of the present invention exhibit a very high long-term stability. It has been found that a fuel cell of the invention can be operated continuously over long periods of more than 5000 hours, for example, at temperatures of more than 120° C. with dry reaction gases without any finding of a marked deterioration in performance being possible (cf. FIG. 1). The power densities which can be achieved in this context are very high even after such a long period of time.

The MEAs of the invention can be produced inexpensively and simply, moreover.

For further information on membrane electrode assemblies refer to the technical literature, in particular to U.S. Pat. No. 4,191,618, U.S. Pat. No. 4,212,714 and U.S. Pat. No. 4,333,805. The disclosure content contained in the aforementioned references [U.S. Pat. No. 4,191,618, U.S. Pat. No. 4,212,714 and U.S. Pat. No. 4,333,805] concerning the construction and production of membrane electrode assemblies and also concerning the electrodes to be chosen, gas diffusion layers and catalysts, is also part of the description.

The invention claimed is:

1. A membrane electrode assembly comprising:
two electrochemically active electrodes separated by a polymer electrolyte membrane having a surface and an opposite surface, wherein the polymer electrolyte membrane comprises a polymer with repeating units of polyazole and a dopant including phosphoric acid, wherein the dopant is present with a degree of doping, indicated in moles of the phosphoric acid per mole of repeating unit of the polyazole, of 5 to 50,
a polyimide layer on the surface and in contact with one of the two electrodes, and a polyimide layer on the opposite surface and in contact with the other of the two electrodes, and wherein each of said polyimide layers on the polymer electrolyte membrane form a frame structure, in which each of
the two polyimide layers extend beyond the membrane and are in flat contact with one another and welded together, and the frame overlaps each of the two electrodes by 0.2 to 5 mm, but the frame does not cover a free electrode area, and the membrane electrode assembly can be operated at temperatures above 120° C. without moistening,
wherein the thickness of the polyimide layers is in the range from 5 μm to 1000 μm, and at least one of the polyimide layers is coated with fluoropolymer facing the electrode to improve upon the adhesion between the polyimide layer and the electrode, and the fluoropolymer coating has a thickness of at least 0.5 μm.

2. The membrane electrode assembly of claim 1, wherein each of the two active electrodes have an electrochemically active area of at least 2 $cm^2$.

3. The membrane electrode assembly of claim 1, wherein the fluoropolymer is poly(tetrafluoroethylene-co-hexafluoropropylene) FEP.

4. The membrane electrode assembly of claim 1, wherein the phosphoric acid is at least 50% by weight, based on the weight of the dopant.

5. The membrane electrode assembly of claim 1, further comprising electrically conducting separator plates positioned between each of the two electrodes and respective polyimide layers wherein the separator plates include flow-field channels on a surface facing the electrode to facilitate distribution of reactant fluids.

6. The membrane electrode assembly of claim 1, wherein the surface and the opposite surface of the polymer electrolyte membrane are covered completely by the two electrodes and the polyimide layers.

7. A fuel cell comprising at least one membrane electrode assembly according to claim 6.

8. A fuel cell comprising at least one membrane electrode assembly according to claim 1.

9. The membrane electrode assembly of claim 1, wherein at least one of the electrodes is made of a compressible material.

10. The membrane electrode assembly of claim 1, wherein the polyimide contains repeating units of the formula (VI)

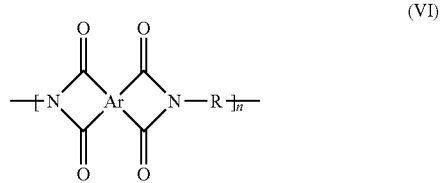

wherein the radical Ar is identical or different at each occurrence and is a tetravalent aromatic or heteroaromatic group which may be monocyclic or polycyclic, the radical R is an alkyl group or a divalent aromatic or heteroaromatic group having 1 to 40 carbon atoms and n indicates that the repeating units constitute part of the polymers.

11. The membrane electrode assembly of claim 1, wherein the contact area between each of the polyimide layers and their respective active electrode is at least 5 $mm^2$ and the contact area is less than or equal to 80% based on the electrochemically active surface area.

12. The membrane electrode assembly of claim 11, wherein the contact area is less than or equal to 60% based on the electrochemically active surface area.

13. The membrane as claimed in claim 12, wherein said phosphoric acid is at least 80% by weight, based on the weight of the dopant.

14. The membrane as claimed in claim 12, wherein the phosphoric acid is present with a degree of doping, indicated in moles of acid per mole of repeating unit of the polyazole, of 5 to 40.

15. The membrane as claimed in claim 12, wherein the phosphoric acid is present with a degree of doping, indicated in moles of acid per mole of repeating unit of the polyazole, of 5 to 18.

16. The membrane as claimed in claim 11, wherein the phosphoric acid is present with a degree of doping, indicated in moles of acid per mole of repeating unit of the polyazole, of 5 to 40.

17. The membrane as claimed in claim 11, wherein the phosphoric acid is present with a degree of doping, indicated in moles of acid per mole of repeating unit of the polyazole, of 5 to 18.

18. The membrane as claimed in claim 1, wherein said phosphoric acid is at least 80% by weight, based on the weight of the dopant.

19. The membrane as claimed in claim 1, wherein the phosphoric acid is present with a degree of doping, indicated in moles of acid per mole of repeating unit of the polyazole, of 5 to 40.

20. The membrane as claimed in claim 1, wherein the phosphoric acid is present with a degree of doping, indicated in moles of acid per mole of repeating unit of the polyazole, of 5 to 18.

21. A membrane electrode assembly comprising two electrochemically active electrodes separated by a polymer electrolyte membrane having a surface and an opposite surface, wherein the polymer electrolyte membrane comprises a polymer with repeating units of polyazole and a dopant including phosphoric acid, wherein the phosphoric acid accounts for at least 50% by weight of the dopant to obtain proton conductivity for the membrane, and
a polyimide layer on the surface and in contact with one of the two electrodes, and a polyimide layer on the opposite surface and in contact with the other of the two electrodes, the contact area between each of the polyimide layers and each respective electrode is at least 2 mm$^2$, and the contact area is less than or equal to 60% based on the electrochemically active surface area,
and wherein said polyimide layers on the polymer electrolyte membrane form a frame structure, in which each of the two polyimide layers extend beyond the membrane and are in flat contact with one another and welded together, and the frame overlaps each of the two electrodes by 0.2 to 5 mm, but the frame does not cover a free electrode area, and the membrane electrode assembly can be operated at temperatures above 120° C. without moistening, and
at least one of the polyimide layers is coated with fluoropolymer, the coating adjacent to the electrode to improve upon the adhesion between the polyimide layer and the electrode, and the fluoropolymer coating has a thickness of at least 0.5 μm.

22. The membrane as claimed in claim 21, wherein said phosphoric acid is at least 80% by weight, based on the weight of the dopant.

23. The membrane as claimed in claim 21, wherein the phosphoric acid is present with a degree of doping, indicated in moles of acid per mole of repeating unit of the polyazole, of 5 to 40.

24. The membrane as claimed in claim 21, wherein the phosphoric acid is present with a degree of doping, indicated in moles of acid per mole of repeating unit of the polyazole, of 5 to 18.

25. A fuel cell comprising at least one membrane electrode assembly according to claim 21.

26. A membrane electrode assembly comprising:
two electrochemically active electrodes separated by a polymer electrolyte membrane having a surface and an opposite surface, wherein the polymer electrolyte membrane comprises a polymer with repeating units of polyazole and a dopant including phosphoric acid, wherein the phosphoric acid accounts for at least 80% by weight, based on the weight of the dopant; and
a first polyimide layer adjacent to the surface, and a second polyimide layer adjacent to the opposite surface, each of the polyimide layers arranged between the membrane and the respective active electrode, the contact area between each of the polyimide layers and each respective electrode is at least 5 mm$^2$, and the contact area is less than or equal to 60% based on a electrochemically active surface area,
wherein the polyimide layers on the polymer electrolyte membrane form a frame structure, in which each of the two polyimide layers extend beyond the membrane and are in flat contact with one another and welded together, and the frame overlaps each of the two electrodes by 0.2 to 5 mm, but the frame does not cover a free electrode area, and
at least one of the polyimide layers is coated with a fluoropolymer and the coating of fluoropolymer has a thickness of at least 0.5 μm.

27. The membrane electrode assembly of claim 26, wherein the polyazole polymer is doped with 3 to 30 moles of phosphoric acid per mole of repeating unit of polyazole polymer.

28. The membrane electrode assembly of claim 27, wherein the concentration of moles of phosphoric acid per repeating unit of pyrazole polymer is between 5 to 18.

29. The membrane electrode assembly of claim 26, wherein the surface and the opposite surface of the polymer electrolyte membrane is covered completely by the two electrodes and the polyimide layers.

30. The membrane electrode assembly of claim 26, wherein the two polyimide layers have a thickness of from 10 μm to 500 μm.

31. The membrane electrode assembly of claim 30, further comprising electrically conducting separator plates positioned between each of the two electrodes and the respective first and second polyimide layers, wherein the separator plates include flowfield channels on a surface facing the electrode to facilitate distribution of reactant fluids.

32. The membrane electrode assembly of claim 26, wherein the fluoropolymer coating is positioned provided between the polymer electrolyte membrane and the polyimide layer.

33. The membrane electrode assembly of claim 32, further comprising a fluoropolymer coating positioned provided between the polyimide layer and the electrode to improve upon the adhesion between the polyimide layer and the electrode.

34. The membrane electrode assembly of claim 32, wherein the fluoropolymer is selected from polyfluorotetraethylene (PTFE) or poly(tetrafluoroethylene-co-hexafluoropropylene) (FEP).

35. The membrane electrode assembly of claim 26, wherein the fluoropolymer coating is positioned provided between the polyimide layer and the electrode to improve upon the adhesion between the polyimide layer and the electrode.

36. A fuel cell comprising at least one membrane electrode assembly according to claim 26.

37. The fuel cell of claim 36 capable of being operated at temperatures above 120° C. without moistening of fuel gases, wherein the fuel cell maintains stable operation and does not lose its conductivity.

38. The fuel cell of claim 37 capable of being cooled to room temperature and restarted over a period of at least 5000 hours without decrease in performance.

\* \* \* \* \*